(12) United States Patent
Souza (10) Patent No.: US 9,225,778 B2
(45) Date of Patent: Dec. 29, 2015

(54) SYSTEM FOR DELIVERY OF CONTENT TO BE PLAYED AUTONOMOUSLY

(75) Inventor: Victor Souza, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 152 days.

(21) Appl. No.: 12/991,565

(22) PCT Filed: Jun. 4, 2008

(86) PCT No.: PCT/SE2008/050661
§ 371 (c)(1),
(2), (4) Date: Nov. 8, 2010

(87) PCT Pub. No.: WO2009/136828
PCT Pub. Date: Nov. 12, 2009

(65) Prior Publication Data
US 2011/0093534 A1    Apr. 21, 2011

Related U.S. Application Data

(60) Provisional application No. 61/051,163, filed on May 7, 2008.

(51) Int. Cl.
G06F 15/16 (2006.01)
H04L 29/08 (2006.01)

(52) U.S. Cl.
CPC .......... *H04L 67/104* (2013.01); *H04L 67/1076* (2013.01); *H04L 67/06* (2013.01)

(58) Field of Classification Search
CPC .... H04L 67/104; H04L 67/06; H04L 67/1076

USPC .......... 709/201–203, 217–218, 223; 370/352
See application file for complete search history.

(56) References Cited

U.S. PATENT DOCUMENTS

| | | | | |
|---|---|---|---|---|
| 6,055,562 A * | 4/2000 | Devarakonda et al. | ....... | 709/202 |
| 6,658,000 B1 * | 12/2003 | Raciborski et al. | ........... | 370/386 |
| 6,701,316 B1 * | 3/2004 | Li et al. | ..................... | 370/395.41 |
| 6,810,417 B2 * | 10/2004 | Lee | ................ | 709/220 |
| 6,886,029 B1 * | 4/2005 | Pecus et al. | .................. | 709/203 |
| 6,888,477 B2 * | 5/2005 | Lai et al. | ......................... | 341/50 |
| 6,892,218 B2 * | 5/2005 | Heddaya et al. | ............... | 709/202 |

(Continued)

OTHER PUBLICATIONS

Antonio Puliafito, Orazio Tomarchio, Lorenzo Vita. MAP: Design and Implementation of a Mobile Agents Platform, Istituto di Informatica e Telecomunicazioni , 2000, p. 1-27.*

(Continued)

*Primary Examiner* — Brian J Gillis
*Assistant Examiner* — Amy Ling (57) ABSTRACT

The dynamicity of current content delivery environments demands the use of highly complex algorithms. A content delivery system for delivering content to clients in a content delivery network is disclosed and further comprises a method for placing the content in the content delivery network. The content delivery system comprises at least one mobile object adapted to be executed on the content delivery system but also adapted to be executed on other content delivery systems. Each mobile object comprises a media file and is adapted to monitor data related to the clients access of the media file. When certain conditions are met, e.g. when many clients that are accessing the media file are closer to another content delivery system, the mobile object can decide to move or copy itself to the other content delivery system.

13 Claims, 5 Drawing Sheets

(56) References Cited

U.S. PATENT DOCUMENTS

| | | | |
|---|---|---|---|
| 6,970,902 B1* | 11/2005 | Moon ............................. | 709/201 |
| 7,024,466 B2* | 4/2006 | Outten et al. ................. | 709/219 |
| 7,254,608 B2 | 8/2007 | Yeager et al. | |
| 7,415,537 B1 | 8/2008 | Maes | |
| 7,499,990 B1* | 3/2009 | Tai et al. ....................... | 709/223 |
| 7,689,510 B2 | 3/2010 | Lamkin et al. | |
| 7,761,609 B1 | 7/2010 | Srinivasan et al. | |
| 8,150,897 B2* | 4/2012 | Shoji et al. .................... | 707/823 |
| 8,260,881 B1* | 9/2012 | Paleja et al. ................... | 709/218 |
| 8,266,357 B2 | 9/2012 | Knowles et al. | |
| 8,423,496 B1* | 4/2013 | Hauser ............................ | 706/47 |
| 8,510,596 B1 | 8/2013 | Gupta et al. | |
| 8,713,708 B1* | 4/2014 | Goldberg ........................ | 726/31 |
| 2001/0025346 A1 | 9/2001 | Kayashima et al. | |
| 2002/0120721 A1 | 8/2002 | Eilers et al. | |
| 2003/0037097 A1 | 2/2003 | Meyer et al. | |
| 2003/0135566 A1* | 7/2003 | Nishiguchi et al. ........... | 709/206 |
| 2003/0154399 A1 | 8/2003 | Zuk et al. | |
| 2004/0010590 A1* | 1/2004 | Manzano ....................... | 709/224 |
| 2005/0060561 A1* | 3/2005 | Pearson et al. ................ | 713/194 |
| 2005/0210120 A1 | 9/2005 | Yukie et al. | |
| 2005/0235148 A1* | 10/2005 | Scheidt et al. ................. | 713/168 |
| 2005/0273858 A1* | 12/2005 | Zadok et al. ................... | 726/24 |
| 2006/0015580 A1 | 1/2006 | Gabriel et al. | |
| 2006/0018264 A1 | 1/2006 | Yamakawa | |
| 2006/0161635 A1 | 7/2006 | Lamkin et al. | |
| 2006/0236367 A1 | 10/2006 | Wallis et al. | |
| 2006/0248139 A1 | 11/2006 | Sundar | |
| 2007/0033340 A1* | 2/2007 | Tulskie et al. ................. | 711/108 |
| 2007/0094675 A1* | 4/2007 | Ryan ............................. | 719/330 |
| 2007/0168294 A1* | 7/2007 | Tsurukawa ..................... | 705/59 |
| 2007/0217436 A1 | 9/2007 | Markley et al. | |
| 2007/0226365 A1 | 9/2007 | Hildreth et al. | |
| 2007/0237133 A1 | 10/2007 | Woods et al. | |
| 2007/0266383 A1* | 11/2007 | White .............................. | 718/1 |
| 2007/0282951 A1* | 12/2007 | Selimis et al. ................. | 709/205 |
| 2008/0059631 A1* | 3/2008 | Bergstrom et al. ............ | 709/224 |
| 2008/0216145 A1 | 9/2008 | Barton et al. | |
| 2009/0055547 A1* | 2/2009 | Hudson et al. ................. | 709/231 |
| 2009/0165083 A1* | 6/2009 | McLean et al. ................. | 726/1 |
| 2012/0036361 A1 | 2/2012 | Tyhurst et al. | |
| 2012/0072529 A1 | 3/2012 | Ahopelto | |

OTHER PUBLICATIONS

David Kotz and Robert S. Gray, Mobile Agents and the Future of the Internet, 1999, Department of Computer Science / Thayer School of Engineering Dartmouth College, 1999, pp. 7-13.*

Antonio Puliafito, Orazio Tomarchio, Lorenzo Vita. MAP: Design and Implementation of a Mobile Agents Platform, Istituto di U Informatica e Telecomunicazioni, 2000, p. 1-27.*

* cited by examiner

SYSTEM FOR DELIVERY OF CONTENT TO BE PLAYED AUTONOMOUSLY

This application claims the benefit of U.S. Provisional Application No. 61/051,163, filed May 7, 2008, the disclosure of which is fully incorporated herein by reference.

TECHNICAL FIELD OF THE INVENTION

The present invention relates to a method and a system for content delivery.

DESCRIPTION OF RELATED ART

A content delivery network or content distribution network (CDN) is a system of computers (content servers) networked together across the Internet and that delivers content (especially media content) to clients. Content delivery networks are difficult to control and manage as requests for content come from different locations sometimes following certain viewing patterns. In order to optimize performance, locations of the content servers and media content close to the client may be chosen. Many parameters have to be taken into account to optimize the media delivery in content delivery networks, for example:

Number of content servers
Locations of the clients and the content servers
Location of an asset (media content)
Popularity of an asset
Available bandwidth in the network
Cost for moving a content The number of parameters and unpredictability when it comes to user behavior makes this problem very complex if one wants to control a global CDN using a central management system.

Existing solutions try to solve this problem in a centralized approach. Taking all the parameters into account the different solutions try to best place content in the network. However, the dynamicity of such an environment makes the algorithms highly complex and global decisions take a long time to be made and effectuated.

Another technical area relevant to the current invention is mobile objects (also called mobile agents). Mobile objects are programs (software) and associated data that can migrate from host to host in a network at times and to places of their own choosing. In the new host they can then continue to run, possibly interacting with the local execution environment. Mobile objects have for example been discussed in the paper 'Mobile Agents and the Future of the Internet' by Kotz et al published in 'ACM Operating Systems Review, August 1999 pp 7-13. An example of using mobile agents is disclosed in U.S. Pat. No. 7,254,608. This patent discloses a system and a method for using mobile agents for managing distribution of content in peer-to-peer networks. In the patent the mobile agent may visit the peer nodes on an itinerary to search for and collect information on distributor content stored on the visited peer.

SUMMARY OF THE INVENTION

The present invention relates to the problem of how to avoid the disadvantages mentioned above of managing a content delivery network.

The problem is in the current invention solved by placing the content itself (such as media files) in the mobile objects (agents). The invention comprises a content delivery system for delivering content to clients. This content delivery system comprises at least one mobile object adapted to be executed on the content delivery system but also adapted to be executed on other content delivery systems. What characterizes these mobile objects is that they comprise:

a media file accessible by the client,
a policy data base and
execution logic that is adapted to monitor data related to the client's access of the media file, to interrogate the policy data base and to move or copy the mobile object towards the other content delivery system when certain conditions stored in the policy data base are met.

The invention does also include a method for placing content in the content delivery network.

In the method, the mobile object (comprising the policy data base and the media file accessible by the client as described above) executes in one content delivery system. The mobile object monitors data related to the client's access of the media file and when certain conditions stored in the policy data base are met, the mobile object moves or duplicates itself to another content delivery system.

As one option, the mobile object moves from the original content delivery system to the other system without leaving any trace in the original system. The mobile object could either be adapted to keep its execution states when starting to execute in the other content delivery system or it could be adapted to reset the execution states prior to the execution.

Another option is to copy the mobile object in the original content delivery system to the other system and that the mobile object in the original system continues to execute in parallel with the mobile object in the other system.

The current invention makes the content (e.g., a media file) autonomous. By autonomous is here meant that the mobile object is intelligent enough to monitor data related to the client's access of the media file (e.g., number of times the media file has been downloaded, local link utilization measurements, link costs, etc) and take appropriate decisions. Instead of utilizing a central server (or a couple of servers) to gather global information and take global decisions the invention comprises a mobile object that takes local decisions based on local information. This will highly simplify the way content is placed and controlled through content delivery networks.

The objective with the current invention is therefore to overcome the disadvantages mentioned above.

The invention has several advantages:

Robustness; the system is more robust since it features strong fault isolation characteristics. The mobile objects are independent pieces of software relying on the local environment and not on centralized systems. It is harder to launch a denial of service attack towards such a distributed system.

No central point of failure; equal distribution of control and management functionalities brings a nice load distribution and no central point of failure.

Simplicity; the complexity of traditional global optimization algorithms is eliminated by allowing local decisions based on local knowledge to be taken.

Lower maintenance/management costs; simplicity leads to lower cost of maintenance of the entire system.

The invention will now be described in more detail and with preferred embodiments and referring to accompanying drawings.

DETAILED DESCRIPTION OF EMBODIMENTS

Figure 1:
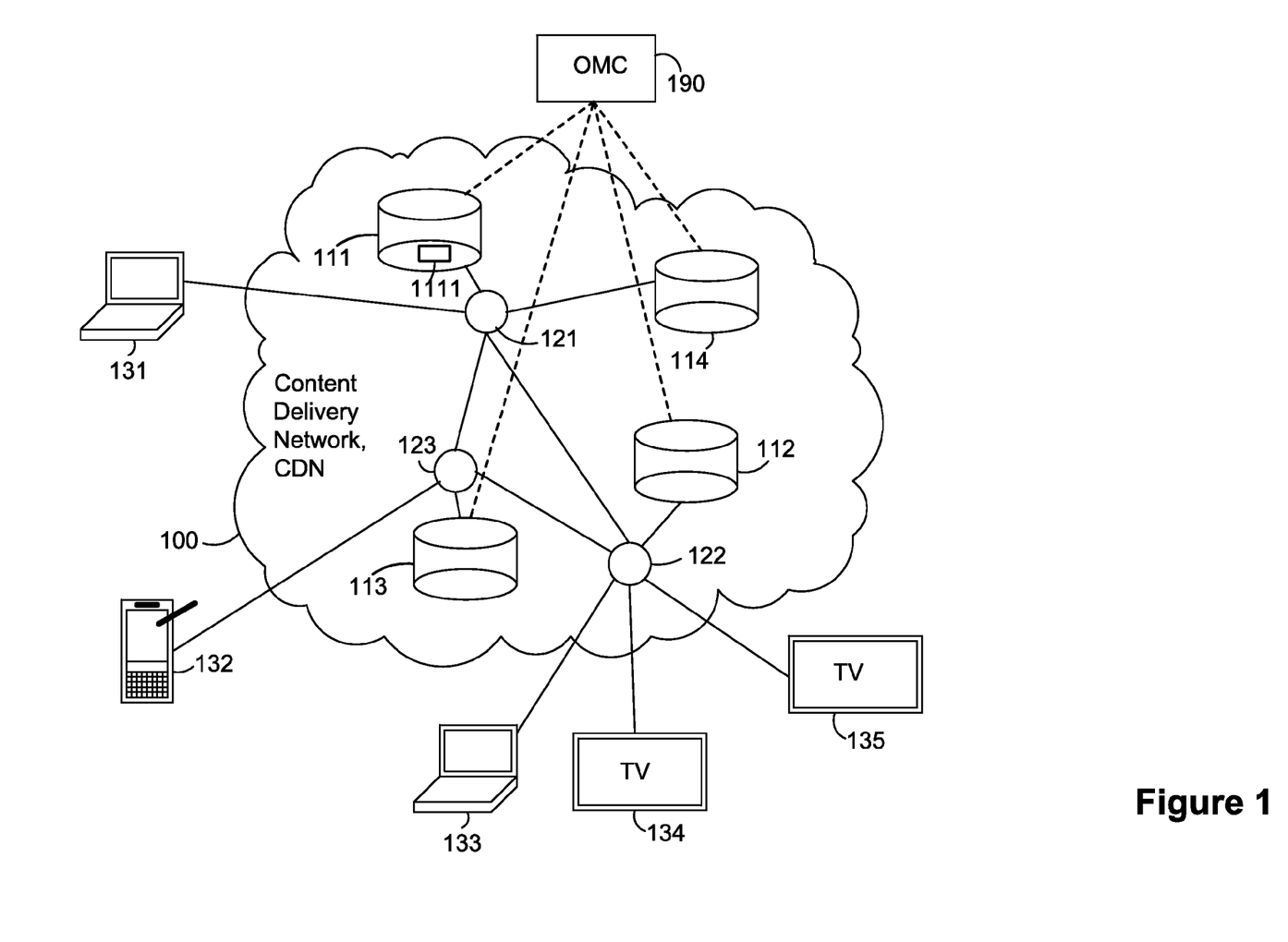
FIG. 1 is a block diagram illustrating a content delivery network.

FIG. 1 illustrates an example of a content delivery network CDN 100. The CDN 100 comprises in this example, four content servers 111, 112, 113 and 114. These content servers 111-114 are interconnected by a network comprising a number of routers or switches 121, 122 and 123. In content server 111, a media file 1111 is stored. The media file 1111 can in this example be accessed by five different clients 131, 132, 133, 134 and 135. As a majority of the clients are located closer to server 112 than server 111, it is worth to consider moving the content, i.e., the media file 1111 from server 111 to server 112. Closer can here be a network based distance, e.g., number of node hops in between the server 111, 112 and the clients 131-135. By moving the content closer to the clients 133, 134 and 135 transmission resources are saved in the network 100, there will be lower delays and the response time will be faster.

In known prior art, the content servers 111, 112, 113 and 114 are managed by a central operation and management center, OMC 190. As discussed above, this solution has a number of drawbacks.

Figure 2:
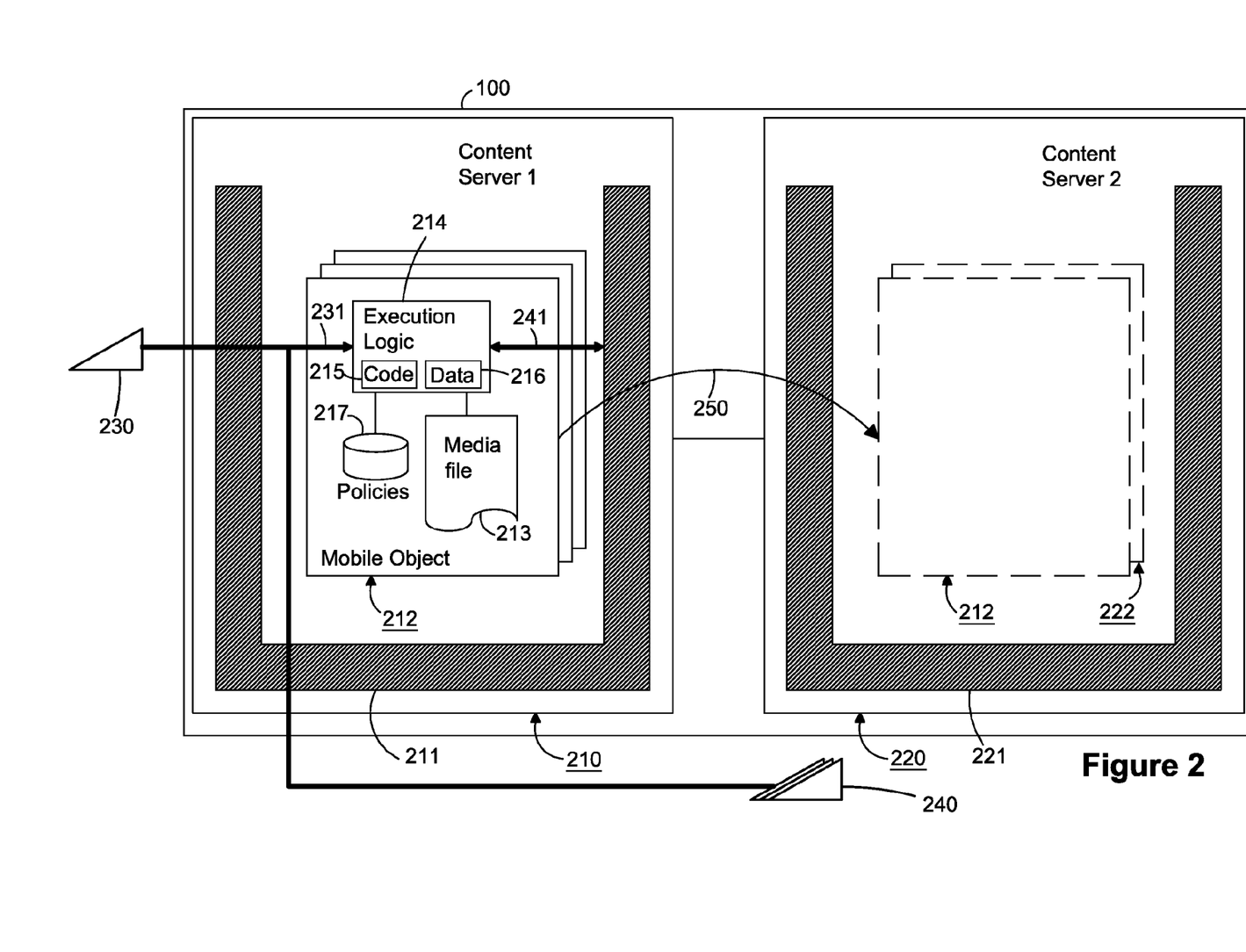
FIG. 2 is a block diagram illustrating a first embodiment of a content delivery system and a mobile object according to the current invention.

FIG. 2 describes an embodiment of the current invention. The content delivery system is here a Content Server 1 210 and a mobile object 212 according to the current invention. Content Server 1 210 comprises an execution environment 211 and at least one mobile object 212. The mobile object 212 comprises a media file 213. This media file 213 could be a data file such as a film, a streaming video, a game, an audio file, a document etc that can be accessed in action 231 by a client 230, 240 for on-line viewing or for download.

The mobile object 212 further comprises execution logic 214. The execution logic comprises program code 215 and a data area 216 that is used to execute the mobile object 212. The execution logic 214 is also handling requests in action 231 from the clients 230, 240 that want to access the media file 213. The programming language for the program code 215 could preferably be Java which has been the most used programming language to implement mobile objects as it is platform independent. The data area 216 comprises also data related to the client's 230, 240 access of the media file 213 as for example:

Number of active connections (between the clients 230, 240 and the mobile object 212).

Number of total accesses to the mobile object 212.

Number of times the media file 213 has been accessed per time unit (e.g., number of accesses per minute).

Location of the clients 230, 240 accessing the media file 213 (using for example the source IP address of the clients 230, 240).

Location of other servers.

In addition to monitor data in the data area 216 in the mobile object 212, the execution logic 214 is also adapted to monitor in action 241 data related the execution environment 211 as for example:

Available bandwidth and/or processor load.

Available communication links between the content server 210 and the clients 230, 240.

Communication link usage and/or link costs.

The mobile object 212 further comprises a policy data base 217. This data base 217 is adapted to comprise any kind of application specific policies that can trigger actions by the mobile object 212 as for example:

The maximum and minimum acceptable number of accesses to the media file 213 per time unit.

The maximum and minimum acceptable bandwidth to be consumed by the mobile object 212.

The maximum network cost of transmission of a media file (213).

Using the data 216 related to the access of the media file 213 and the execution environment 211 and interrogating the policy data base 217, the execution logic 214 can for example determine that a majority of the clients 240 accessing the media file 213 are located close to another server, Content Server 2 220.

Fulfilling certain conditions stored in the policy data base 217 the execution logic 214 may trigger a process to move, in action 250, the mobile object 212 from Content Server 1 210 to Content Server 2 220 which has its own execution environment 221.

In this process the mobile object 212 stops serving requests from the clients 230, 240. Active connections with clients 230, 240 are paused. The clients 230, 240 are informed about the pause by the mobile object 212 using suitable signaling protocols (e.g., a modified TCP). This signaling is normally demanding some support from the execution environment 211 and underlying operating system. The execution environments 211 and 221, on the other hand, do not know where the mobile object 212 came from or where it is going next.

In the process of moving, the mobile object 212 moves from the original Content Server 1 210 to Content Server 2 220 without leaving any traces in Content Server 1 210.

Fulfilling other conditions stored in the policy data base 217 the execution logic 214 may trigger a process to copy the mobile object 212 from Content Server 1 210 to a new mobile object 222 in Content Server 2 220. In this case, the mobile object 212 in Content Server 1 210 continues to execute in parallel with the copy 222.

The copy 222 of mobile object 212 could either be adapted to keep its execution states when starting to execute in Content server 2 220 or it could be adapted to reset the execution states prior the execution.

In order for clients not previously connected to find the new location of the mobile object 212, a name resolution process is started using for example DNS (Domain Name Service) redirection.

A situation that also can occur is that very few (or no) clients at all have accessed the media file 213 for a certain period of time. This can be an indication that the media file 213 has become less popular or that the clients 240 are located close to another Content Server 2 220 already hosting a copy of the media file 213. In this situation, the execution logic 214 can take a decision to simply let the mobile object 212 in Content Server 1 210 'die' and delete itself.

Figure 3A:
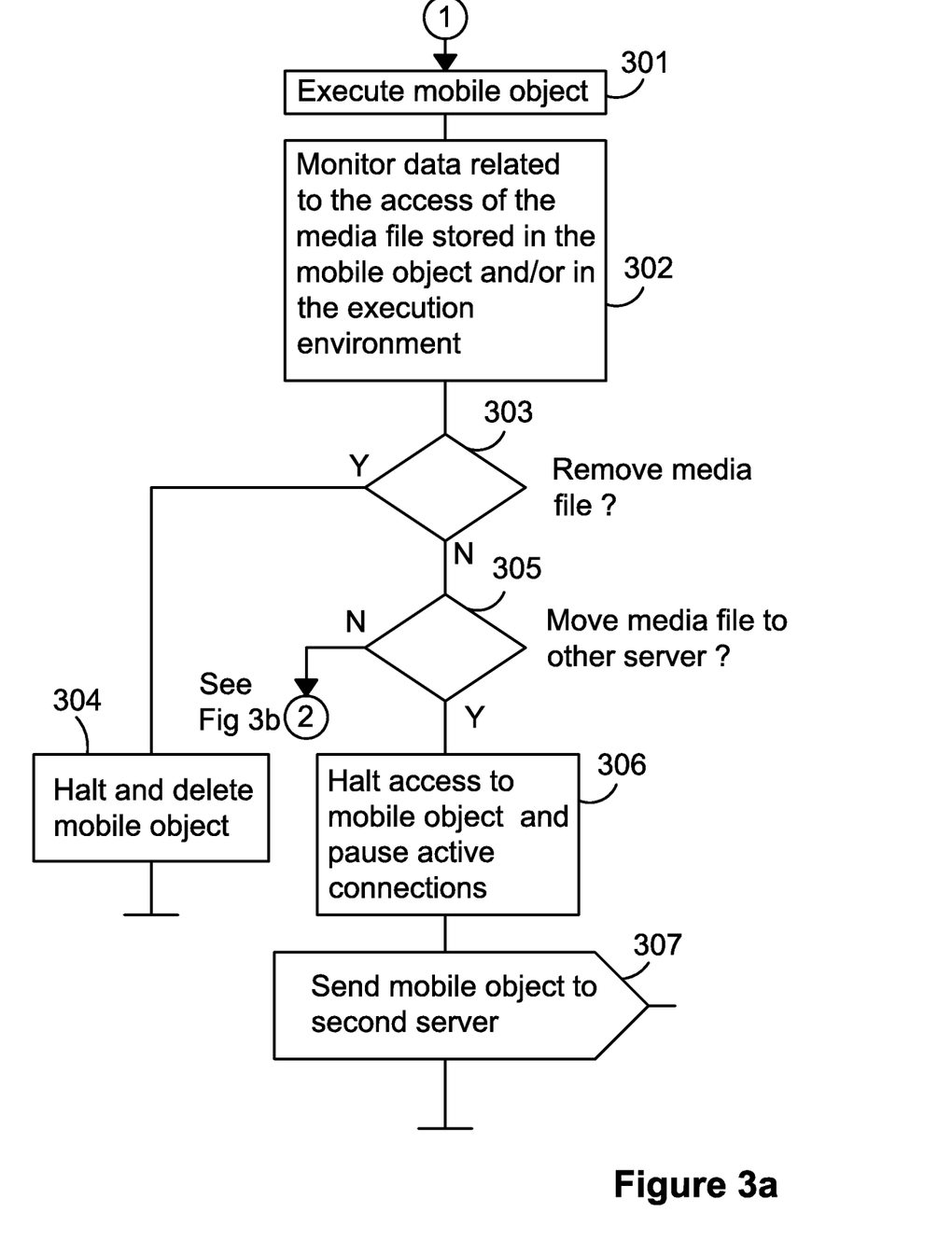
FIGS. 3a and 3b are flow charts showing the method of allocating content in a content delivery network according to the current invention.
Figure 3B:
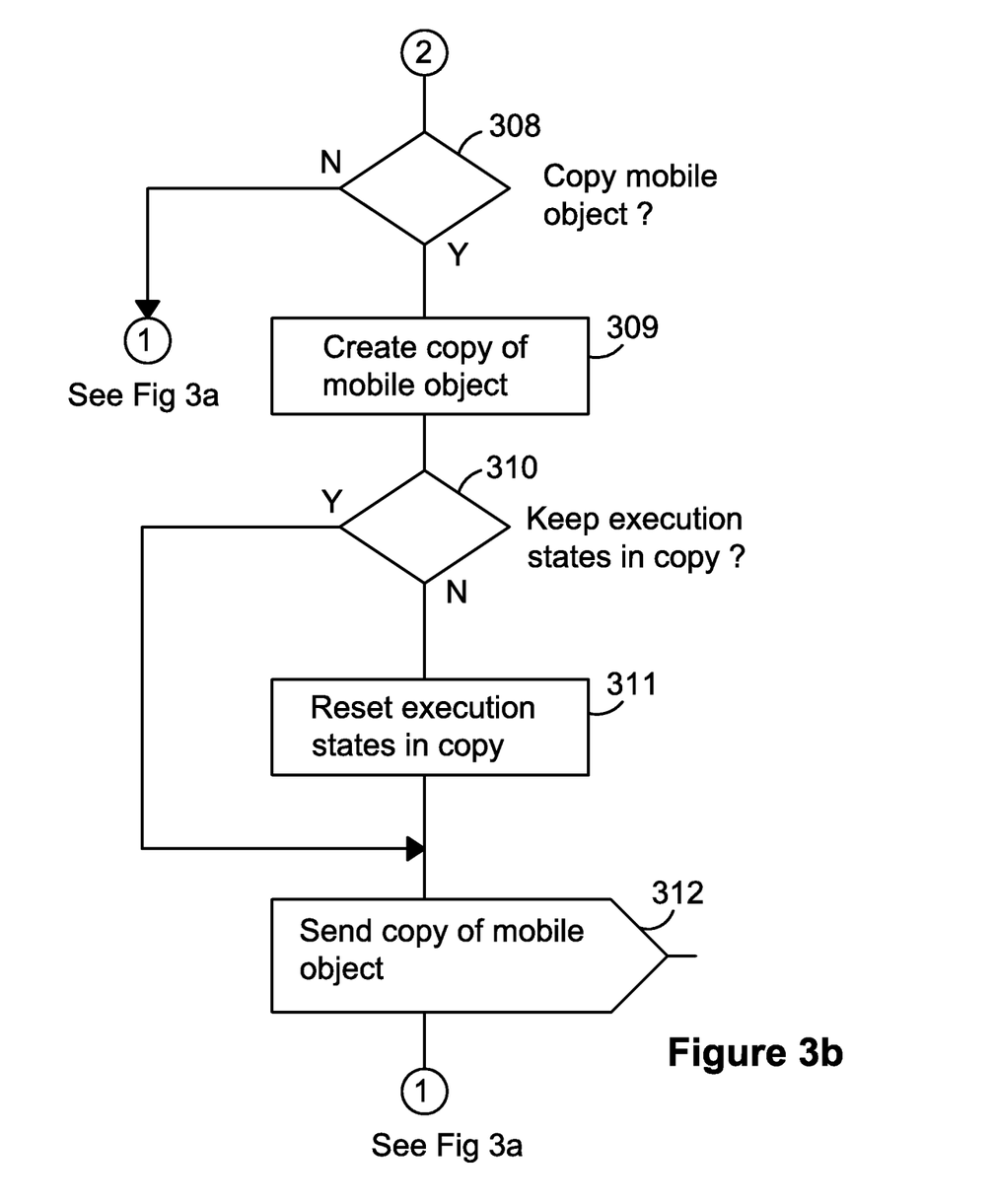

The flow charts in FIGS. 3a and 3b illustrate an embodiment of the method of allocating content in a content delivery network 100 according to the current invention. The mobile object 212 is executing in the original server 210 in step 301. During execution it monitors in step 302 data related to the client's access of the media file 213. This data can be collected by the mobile object itself 212 and stored in the data area 216. The data can also be located in the execution environment 211 and accessed in action 241 by the mobile object 212.

In step 303, a check is made if the media file 213 can be deleted. If a certain period of time has lapsed without any client 230, 240 accessing the media file 213 or that the media file 213 has been accessed very seldom, the mobile object 212 can make the decision to halt the execution and delete itself in step 304. The conditions for this are stored in the policy data base 217. If, on the contrary, the media file 213 is very popular but mainly accessed by clients 240 located closer to the other content server 220, the mobile object 212 makes the decision in step 305 to move the mobile object 212 to the other server 220. But before sending the mobile object to the other content server 220 in step 307, the mobile object 212 halts in step 306 the access to the media file 213 and pauses the active connections between clients 230, 240 and the mobile object 212.

If the decision in step 305 is to not move the media file 213, the flow chart continues (digit '2' encircled) in FIG. 3b.

If the media file 213 is popular in both regions where clients 230 (close to Content Server 1 210) and clients 240 (close to Content Server 2 220) are located, the mobile object 212 can make the decision in step 308 (now turning to FIG. 3b) to copy itself in step 309 instead of moving. Before the copy 222 of the mobile object 212 is sent to Content Server 2 220, a check is made in step 310 if the current execution states stored in data area 216 in the copy 222 is to be kept or reset. If the states are to be kept, the copy 222 (a 'clone') of the mobile object 212 is sent in step 312 to content server 2 220. If the states are to be reset, the states are reset in step 311 and the copy 222 (a new 'instance') is sent in step 312. After sending the copy 222 in step 312 the process starts all over again (digit '1' encircled) as illustrated by FIG. 3a. This is also the case if the mobile object 212 decides to not copy itself in step 308.

The current invention is in the embodiments described above applied to a mobile object 212 that is moved and/or copied from one content server 210 to another content server 220. The inventive concept does also allow for the mobile object 212 to migrate between other content delivery systems that have an execution environment that allows for the execution of the mobile object 212.

Figure 4A:
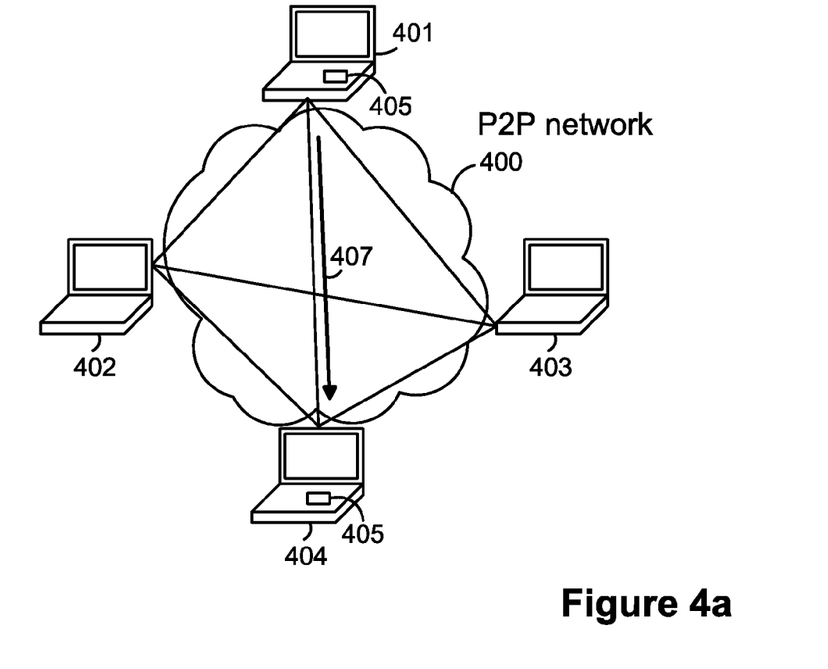
FIG. 4a is a block diagram illustrating a second embodiment of a content delivery system according to the current invention.

One example of this is a peer-to-peer P2P network. FIG. 4a illustrates a P2P network 400 comprising a plurality of terminals 401, 402, 403, 404. In this example all terminals 401-404 are connected to each other fully meshed. The content delivery system (210) corresponds here to any of the terminals 401-404. Assuming that a mobile object 405 is located in terminal 401, the mobile object 405 may decide to move itself in action 407 to another terminal 404.

The inventive concept does also allow the mobile object 212 to move and/or to copy itself within the same content delivery system 210 if needed.

Yet another aspect of the invention is that the content delivery system 220 can be seen as a content delivery end-point (source of content) that is created dynamically when the mobile object 212 is moved or copied into the execution environment 221. As an example, a server that is originally not a content server but having an execution environment 221 adapted for mobile objects in general can become a Content Server 2 220 when the mobile object 212 according to the invention is copied or moved into the execution environment 221 in the server 220.

Furthermore, utilizing the inventive concept a skilled person can create different policies and corresponding behaviors that are more suitable and tailored to the management of a particular content delivery network.

Figure 4B:
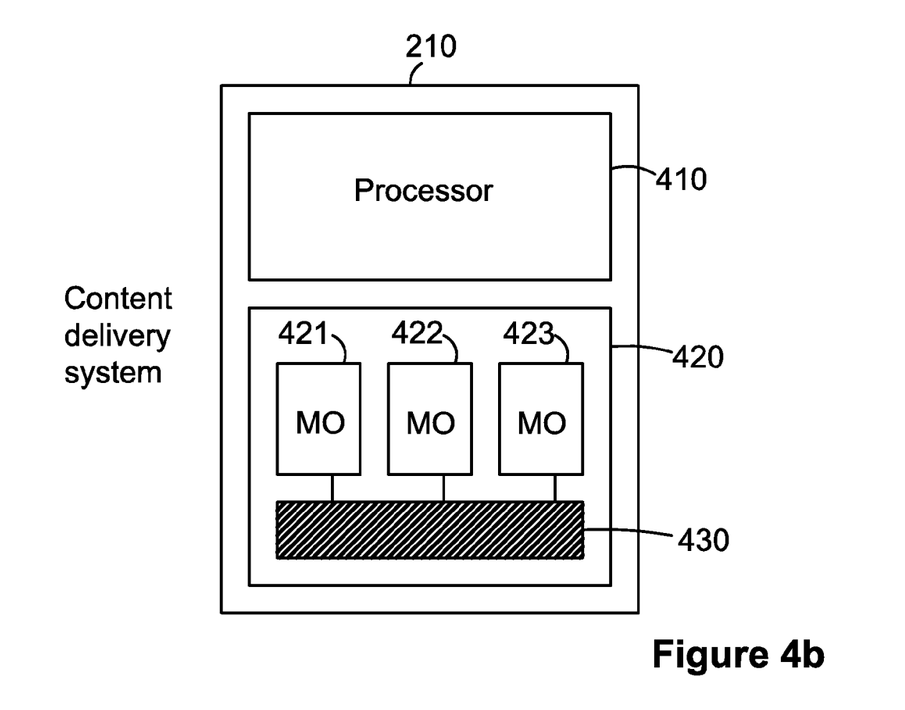
FIG. 4b is a block diagram illustrating an embodiment of an implementation of the content delivery system.

FIG. 4b illustrates an example of an implementation of the content delivery system 210. The system 210 comprises a processor 410 designed to execute software in a memory area 420. This memory area 420 comprises an execution environment 430 and at least one mobile object MO 421, 422, 423. Each of the mobile object 421, 422, 423 is adapted to communicate with the execution environment 430.

The invention claimed is:

1. A first content delivery system for delivering content to one or more clients, said first content delivery system comprising:
   a processor;
   a memory area;
   at least one mobile object stored in the memory area and executed in the first content delivery system and in at least one second content delivery system; and
   wherein the mobile object comprises:
      a media file accessible by the clients;
      a policy data base; and
      execution logic comprising program code and a data area;
      wherein the data area comprises client access data of clients' access of the media file; and
      wherein the execution logic monitors data related to the at least one client's access of the media file, interrogates the policy data base, and moves or copies the mobile object to the second content delivery system based on a maximum and minimum number of accesses by clients to the media file per time unit stored in the policy database being met by the client access data.

2. The content delivery system as in claim 1 wherein the execution logic in the mobile object comprises program code and a data area.

3. The content delivery system as in claim 2 wherein the data area in the mobile object comprises the data related to the at least one client's access of the media file.

4. The content delivery system as in claim 3 further comprising an execution environment adapted for mobile objects and wherein the execution logic in the mobile object is further adapted to monitor data related to the execution environment.

5. The content delivery system as in claim 4 wherein the data related to the execution environment comprises any of the following:
   available bandwidth and/or processor load;
   available communication links between the content server and the one or more clients; and
   communication link usage and/or link costs.

6. The content delivery system as in claim 3 wherein the data area comprises any of the following data:
   number of accesses to the mobile object;
   number of active connections between the one or more clients and the mobile object;
   number of times the media file has been accessed per time unit;
   location of the one or more clients accessing the media file; and
   location of other content delivery systems.

7. The content delivery system as in claim 3 wherein the policy data base comprises any of the following data:
   maximum and minimum acceptable bandwidth to be consumed by the mobile object; and
   maximum network cost for transmission of a media file.

8. The content delivery system as in claim 1 wherein the system is a content server.

9. A method for placing content in a first content delivery network, said method comprising:

executing, in a first content delivery system, a mobile object, said mobile object comprising execution logic, a policy data base and a media file accessible by at least one client, said execution logic further comprising program code and a data area;

monitoring client access data of clients' access of the media file in the data area; and when a maximum and minimum number of accesses by clients to the media file per time unit stored in the policy data base, are met by the client access data:

moving or sending a copy of the mobile object to a second content delivery system.

10. The method as in claim 9 further comprising monitoring data related to an execution environment adapted for mobile objects in the content delivery system.

11. The method as in claim 9 further comprising:

pausing active connections; and halting the execution of the mobile object prior to moving the mobile object to the second content delivery system.

12. The method as in claim 9 further comprising resetting the execution states in the copy of the mobile object prior to sending the copy to the second content delivery system.

13. The method as claim 12 further comprising continuing the execution of the mobile object in the first content delivery system.

* * * * *